(12) United States Patent
Kitamura et al.

(10) Patent No.: US 12,099,326 B2
(45) Date of Patent: Sep. 24, 2024

(54) TONER

(71) Applicant: CANON KABUSHIKI KAISHA, Tokyo (JP)

(72) Inventors: Shin Kitamura, Ibaraki (JP); Nobuyoshi Sugahara, Tokyo (JP); Daisuke Tsujimoto, Tokyo (JP); Kazunari Ooyama, Ibaraki (JP); Yuu Nishimura, Chiba (JP); Kazuki Murata, Ibaraki (JP); Toru Takahashi, Ibaraki (JP); Ryo Nakajima, Chiba (JP); Hitoshi Sano, Chiba (JP); Koh Ishigami, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 680 days.

(21) Appl. No.: 17/210,974

(22) Filed: Mar. 24, 2021

(65) Prior Publication Data

US 2021/0302854 A1    Sep. 30, 2021

(30) Foreign Application Priority Data

Mar. 31, 2020 (JP) .................................. 2020-063373
Mar. 2, 2021 (JP) .................................. 2021-032708

(51) Int. Cl.
*G03G 9/087* (2006.01)
*C08F 212/08* (2006.01)
(Continued)

(52) U.S. Cl.
CPC ....... *G03G 9/08773* (2013.01); *C08F 212/08* (2013.01); *C08G 63/16* (2013.01); *C08G 63/183* (2013.01); *G03G 9/08788* (2013.01)

(58) Field of Classification Search
CPC .................... G03G 9/08773; G03G 9/08788
See application file for complete search history.

(56) References Cited

U.S. PATENT DOCUMENTS 5,639,582 A    6/1997  Imai
6,326,114 B1   12/2001 Itakura et al.
(Continued)

FOREIGN PATENT DOCUMENTS

JP    08-087127      *  4/1996  .............. G03G 9/08
JP    8-87127 A         4/1996
JP    2000338720 A   * 12/2000

OTHER PUBLICATIONS

English machine translation of the description of JP 08-087127 (Year: 1996).*

(Continued)

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle containing a binder resin containing at least 50 mass % of a polyester resin, wherein the polyester resin contains a polyester resin A having a silicone segment, and in XPS analysis, when X is a ratio of the number of silicon atoms attributable to silicone segments relative to a total number of measured atoms, X1 is a value of the X on the toner particle surface, X2 is a value of the X at a depth of 30 nm from the surface, Z is a ratio of the number of carbon atoms attributable to ester bonds relative to a total number of measured atoms, Z1 is a value of the Z on the toner particle surface and Z2 is a value of the Z at a depth of 30 nm from the toner particle surface, X1, Z1, X2 and Z2 satisfy a specific relationship.

9 Claims, 1 Drawing Sheet

(51) Int. Cl.
*C08G 63/16* (2006.01)
*C08G 63/183* (2006.01)

(56) References Cited

U.S. PATENT DOCUMENTS

| | | | |
|---|---|---|---|
| 6,528,222 B2 | 3/2003 | Kohtaki et al. |
| 6,586,147 B2 | 7/2003 | Iida et al. |
| 6,751,424 B2 | 6/2004 | Komatsu et al. |
| 6,929,894 B2 | 8/2005 | Sugahara et al. |
| 7,022,449 B2 | 4/2006 | Sugahara et al. |
| 7,138,213 B2 | 11/2006 | Itakura et al. |
| 7,144,668 B2 | 12/2006 | Baba et al. |
| 7,147,980 B2 | 12/2006 | Itakura et al. |
| 7,279,262 B2 | 10/2007 | Fujikawa et al. |
| 7,288,348 B2 | 10/2007 | Hayami et al. |
| 7,297,455 B2 | 11/2007 | Fujikawa et al. |
| 7,300,733 B2 | 11/2007 | Sugahara et al. |
| 7,320,850 B2 | 1/2008 | Itakura et al. |
| 7,396,626 B2 | 7/2008 | Fujikawa et al. |
| 7,396,629 B2 | 7/2008 | Baba et al. |
| 7,442,478 B2 | 10/2008 | Itakura et al. |
| 7,611,813 B2 | 11/2009 | Ida et al. |
| 7,629,100 B2 | 12/2009 | Okamoto et al. |
| 7,767,370 B2 | 8/2010 | Ishigami et al. |
| 7,833,687 B2 | 11/2010 | Kato et al. |
| 7,858,283 B2 | 12/2010 | Ishigami et al. |
| 7,906,262 B2 | 3/2011 | Ishigami et al. |
| 7,927,775 B2 | 4/2011 | Komatsu et al. |
| 7,939,233 B2 | 5/2011 | Inoue et al. |
| 8,114,562 B2 | 2/2012 | Ishigami et al. |
| 8,137,886 B2 | 3/2012 | Baba et al. |
| 8,298,742 B2 | 10/2012 | Okamoto et al. |
| 8,323,726 B2 | 12/2012 | Naka et al. |
| 8,501,377 B2 | 8/2013 | Takahashi et al. |
| 8,512,925 B2 | 8/2013 | Moribe et al. |
| 8,697,327 B2 | 4/2014 | Shibata et al. |
| 8,921,023 B2 | 12/2014 | Baba et al. |
| 8,927,188 B2 | 1/2015 | Naka et al. |
| 8,945,805 B2 | 2/2015 | Baba et al. |
| 8,974,994 B2 | 3/2015 | Kamae et al. |
| 8,986,914 B2 | 3/2015 | Fujikawa et al. |
| 9,034,551 B2 | 5/2015 | Endo et al. |
| 9,057,970 B2 | 6/2015 | Ida et al. |
| 9,058,924 B2 | 6/2015 | Komatsu et al. |
| 9,063,443 B2 | 6/2015 | Ishigami et al. |
| 9,097,998 B2 | 8/2015 | Yamazaki et al. |
| 9,128,400 B2 | 9/2015 | Takahashi et al. |
| 9,158,217 B2 | 10/2015 | Takahashi et al. |
| 9,348,247 B2 | 5/2016 | Ida et al. |
| 9,454,094 B2 | 9/2016 | Tsujimoto et al. |
| 9,500,975 B2 | 11/2016 | Sugahara et al. |
| 9,540,483 B2 | 1/2017 | Ida et al. |
| 9,599,920 B2 | 3/2017 | Sugahara et al. |
| 9,606,466 B2 | 3/2017 | Takahashi et al. |
| 9,665,023 B2 | 5/2017 | Kamae et al. |
| 9,696,644 B2 | 7/2017 | Ida et al. |
| 9,703,216 B2 | 7/2017 | Tsuchida et al. |
| 9,778,598 B2 | 10/2017 | Onozaki et al. |
| 9,785,070 B2 | 10/2017 | Sugahara et al. |
| 9,897,934 B2 | 2/2018 | Tamura et al. |
| 9,915,885 B2 | 3/2018 | Katsumata et al. |
| 9,958,809 B2 | 5/2018 | Sugahara et al. |
| 9,969,834 B2 | 5/2018 | Ohtsu et al. |
| 10,007,206 B2 | 6/2018 | Sugahara et al. |
| 10,012,918 B2 | 7/2018 | Ishigami et al. |
| 10,012,920 B2 | 7/2018 | Shibata et al. |
| 10,012,921 B2 | 7/2018 | Kamae et al. |
| 10,036,970 B2 | 7/2018 | Kanno et al. |
| 10,078,281 B2 | 9/2018 | Ida et al. |
| 10,088,765 B2 | 10/2018 | Miyakai et al. |
| 10,133,201 B2 | 11/2018 | Kamae et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,216,108 B2 | 2/2019 | Iwasaki et al. |
| 10,228,629 B2 | 3/2019 | Tamura et al. |
| 10,234,777 B2 | 3/2019 | Ohtsu et al. |
| 10,401,748 B2 | 9/2019 | Hashimoto et al. |
| 10,409,188 B2 | 9/2019 | Sugahara et al. |
| 10,423,090 B2 | 9/2019 | Ohtsu et al. |
| 10,451,985 B2 | 10/2019 | Takahashi et al. |
| 10,451,986 B2 | 10/2019 | Sano et al. |
| 10,474,049 B2 | 11/2019 | Onozaki et al. |
| 10,551,759 B2 | 2/2020 | Watanabe et al. |
| 10,642,178 B2 | 5/2020 | Yamashita et al. |
| 10,747,132 B2 | 8/2020 | Takahashi et al. |
| 10,768,543 B2 | 9/2020 | Tsujimoto et al. |
| 10,775,710 B1 | 9/2020 | Kamae et al. |
| 10,838,317 B2 | 11/2020 | Sugahara et al. |
| 10,859,935 B2 | 12/2020 | Ohtsu et al. |
| 10,859,936 B2 | 12/2020 | Sugahara et al. |
| 10,877,386 B2 | 12/2020 | Murayama et al. |
| 10,877,391 B2 | 12/2020 | Matsuo et al. |
| 10,935,902 B2 | 3/2021 | Kanno et al. |
| 10,955,765 B2 | 3/2021 | Onozaki et al. |
| 2010/0028796 A1 | 2/2010 | Nakamura et al. |
| 2010/0183971 A1 | 7/2010 | Fujikawa et al. |
| 2013/0108955 A1 | 5/2013 | Shibata et al. |
| 2013/0244159 A1 | 9/2013 | Ishigami et al. |
| 2013/0252167 A1 | 9/2013 | Moribe et al. |
| 2013/0309603 A1 | 11/2013 | Takahashi et al. |
| 2014/0134535 A1 | 5/2014 | Baba et al. |
| 2015/0099227 A1 | 4/2015 | Ida et al. |
| 2018/0031988 A1* | 2/2018 | Toyoizumi ......... G03G 9/08797 |
| 2018/0275540 A1 | 9/2018 | Matsuo et al. |
| 2018/0314176 A1 | 11/2018 | Ikeda et al. |
| 2020/0064751 A1 | 2/2020 | Murayama et al. |
| 2020/0192233 A1 | 6/2020 | Takahashi et al. |
| 2021/0055668 A1 | 2/2021 | Tamura et al. |
| 2021/0063903 A1 | 3/2021 | Shibata et al. |

OTHER PUBLICATIONS

English machine translation of the description of JP-2000338720-A (Year: 2000).*
U.S. Appl. No. 17/223,070, Toru Takahashi, filed Apr. 6, 2021.
U.S. Appl. No. 17/334,192, Takakuni Kobori, filed May 28, 2021.
U.S. Appl. No. 17/336,397, Takaho Shibata, filed Jun. 2, 2021.
U.S. Appl. No. 17/344,544, Takakuni Kobori, filed Jun. 10, 2021.

* cited by examiner

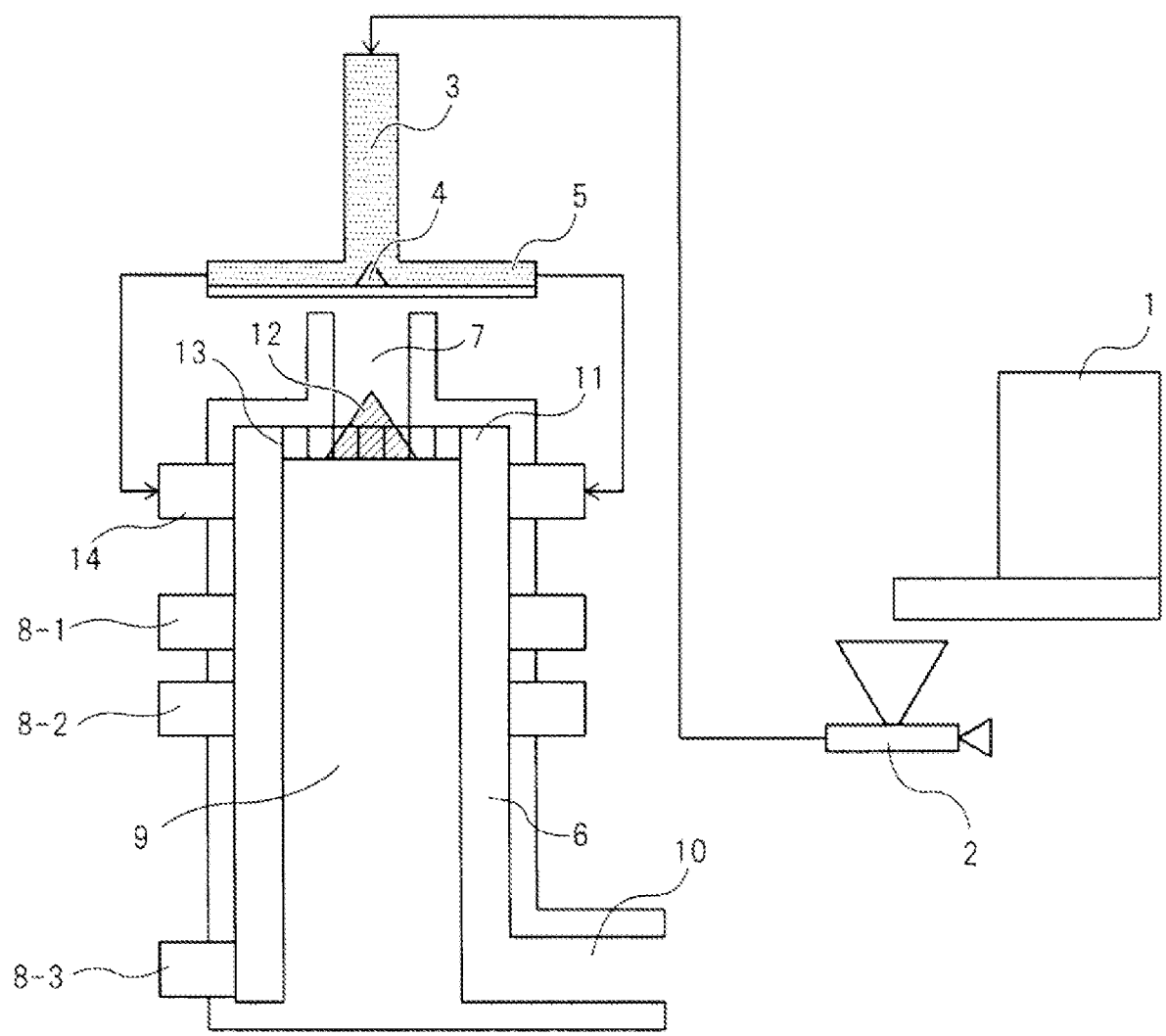

TONER

BACKGROUND OF THE INVENTION

Field of the Invention

The present disclosure relates to a toner for developing electrostatic charge images for use in electrophotographic methods, electrostatic recording methods and the like.

Description of the Related Art

In recent years, electrophotographic full-color copiers have become widely available and also have begun to be applied in the printing market. In the printing market, it has become necessary to cope with a wide range of media (paper types) while meeting requirements for high speed, image quality and productivity. For example, there is demand for media-constant speed, by which it is possible to implement continuous printing without changing the process speed or the heating setting temperature of the fixing device even if the paper type is changed from thick paper to thin paper, for example. To support media-constant speed, there is demand for toners that can be fixed properly at a wide range of temperatures from low to high temperatures. The toner needs to be softened at low temperature while it is necessary to suppress toner offset and paper adhesion to the fixing member due to increased adhesion force on the fixing member at high temperatures.

Moreover, in the printing market, printed materials are used for a wide range of purposes. There is demand for durability so that image damage does not occur even when an image is folded in the case of package printing or printing on thick paper. Japanese Patent Application Publication No. H08-087127 discloses a toner with which the release properties of a fixed image are improved, and toner offset and adhesion of paper to a member are suppressed, by using a polyester resin grafted with a silicone oil.

SUMMARY OF THE INVENTION

Because the toner of the above document uses a polyester resin grafted with a silicone oil, i.e., additive, to improve the release properties of the fixed image surface, the silicone part reduces the intermolecular cohesion in the interior of the toner particle. Thus, there is thus still room for improving the folding resistance of the fixed image. The present disclosure provides a toner with which the release properties of a fixed image surface are improved and the folding resistance of the fixed image on thick paper is also improved.

A toner comprising a toner particle containing a binder resin, wherein
  the binder resin contains a polyester resin in an amount of at least 50 mass % of the binder resin,
  the polyester resin includes a polyester resin A having a structure represented by formula (1) below,
  in analysis of the toner particle with an X-ray photoelectron spectrometer, when X is a ratio of the number of silicon atoms attributable to silicone segments represented by $-(Si(R^x)_2O)_n-Si(R^x)_2-$ in the structure represented by formula (1) in the polyester resin A having the structure represented by formula (1) relative to a total number of measured atoms (silicon atoms/total atoms×100), and X1 is a value of the X on a surface of the toner particle and X2 is a value of the X at a depth of 30 nm from the surface of the toner particle, and
  in analysis of the toner particle with an X-ray photoelectron spectrometer, when Z is a ratio of the number of carbon atoms attributable to ester bonds of the polyester resin relative to a total number of measured atoms (carbon atoms/total atoms×100), and Z1 is a value of the Z on the surface of the toner particle and Z2 is a value of the Z at a depth of 30 nm from the surface of the toner particle,
  the X1 is from 0.5 atom % to 20.0 atom %, and
  Y1 represented by formula (2) below and Y2 represented by formula (3) below satisfy formula (4) below:

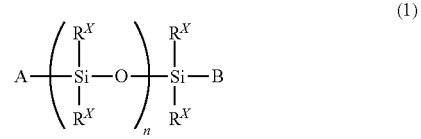

in formula (1), each $R^x$ is independently a hydrogen atom, methyl group or phenyl group,
A represents a polyester segment,
B represents either a polyester segment or any functional group selected from the group consisting of $-R^{20}OH$, $-R^{20}COOH$,

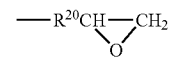

and $-R^{20}NH_2$, $R^{20}$ represents a single bond or $C_{1-4}$ alkylene group, and the average number of repetitions n is 10 to 80;

$$Y1=X1/Z1 \qquad (2)$$

$$Y2=X2/Z2 \qquad (3)$$

$$(Y1-Y2)/Y1 \geq 0.50 \qquad (4).$$

The present disclosure can provide a toner with which the release properties of a fixed image surface are improved and the folding resistance of the fixed image on thick paper is also improved. Further features of the present invention will become apparent from the following description of exemplary embodiments with reference to the attached drawings.

BRIEF DESCRIPTION OF THE DRAWINGS

The FIGURE shows one example of a toner surface treatment apparatus.

DESCRIPTION OF THE EMBODIMENTS

The descriptions of "from XX to YY" or "XX to YY" representing a numerical range mean a numerical range including the lower limit and the upper limit which are endpoints, unless otherwise noted. A crystalline resin is a resin that exhibits a clear endothermic peak in differential scanning calorimetry (DSC).

The inventors conducted earnest research aimed at improving the release properties of the fixed image surface while further improving the folding resistance of the fixed image. We thereby discovered that in a toner containing a polyester resin A having a structure represented by formula (1) below, better image surface release properties and folding resistance than in the past could be obtained by reducing the amount of silicone segments in a gradient from the toner surface to the toner interior.

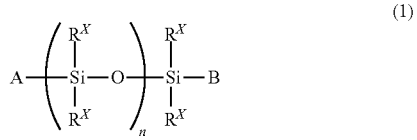

(1)

In formula (1), each $R^x$ independently represents a hydrogen atom, methyl group or phenyl group,
A represents a polyester segment,
B represents either a polyester segment or any functional group selected from the group consisting of —$R^{20}$OH, —$R^{20}$COOH,

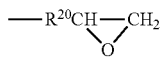

and —$R^{20}NH_2$, in which $R^{20}$ represents a single bond or $C_{1-4}$ alkylene group, the average number of repetitions n is 10 to 80 (preferably 30 to 60), and preferably all of $R^x$ groups are methyl groups.

The segment represented by —$(Si(R^x)_2O)_n$—$Si(R^x)_2$— in the structure represented by formula (1), or in other words the structure of formula (1) minus the A and B parts, is also called a silicone segment. The inventors believe that the above effects were obtained for the following reasons. A polyester resin A having the structure represented by formula (1) is a resin comprising a high-polarity polyester segment bound (by covalent bonds for example) to a low-polarity silicone segment. Because the polyester resin A having the structure represented by formula (1) has a low-polarity silicone segment, it is possible to effectively reduce the surface free energy of the binder resin and improve the release properties of the image surface. However, the inventors' researches have shown that when using a resin having a silicone segment, the folding resistance of the fixed image is reduced on thick paper in particular. This is thought to be because the intermolecular cohesion in the toner interior is reduced due to the presence of the silicone segment.

We then considered that by reducing the amount of silicone segments in a gradient from the toner surface to the toner interior, it could be possible to prevent a loss of intermolecular cohesion in the toner interior while maintaining the low surface free energy state obtained with the silicone segments near the toner surface.

In analysis of the toner particle with an X-ray photoelectron spectrometer (XPS), when X is the ratio of the number of silicon atoms attributable to silicone segments of the polyester resin A having the structure represented by formula (1) (segments represented by —$(Si(R^x)_2O)_n$—$Si(R^x)_2$— in the structure represented by formula (1)) relative to the total number of measured atoms (silicon atoms/total atoms×100), the value X1 of X on the toner particle surface is from 0.5 atom % to 20.0 atom %. X is a value reflecting the abundance of silicone segments and is used as a benchmark of the abundance of silicone segments. If X1 is within this range, it is easier to control the ratio Y1 described below (that is, X1/Z1) within the preferred range, and to achieve both release properties of the image surface and folding resistance due to internal cohesive force inside the toner. The X1 on the toner particle surface is preferably from 4.0 atom % to 15.0 atom %, or more preferably from 7.0 atom % to 12.0 atom %.

In analysis of the toner particle using XPS, moreover, when X2 is the value of X at a depth of 30 nm from the toner particle surface, Z is the ratio of the number of carbon atoms attributable to ester bonds of the polyester resin relative the total number of measured atoms (carbon atoms/total atoms× 100), Z1 is the value of Z on the toner particle surface and Z2 is the value of Z at a depth of 30 nm from the toner particle surface, Y1 represented by formula (2) below and Y2 represented by formula (3) below satisfy the following formula (4):

$Y1=X1/Z1$  (2)

$Y2=X2/Z2$  (3)

$(Y1-Y2)/Y1 \geq 0.50$  (4).

If formula (4) above is satisfied, this means that the amount X of silicone segments decreases in a gradient from the toner particle surface to the interior. It is thought that by providing such as gradient, it is possible to maintain a low surface free energy state with the silicone segments near the toner particle surface while preventing a decrease in intermolecular cohesive force inside the toner particle. This gradient is preferably as steep as possible, and the gradient is expressed numerically as the rate of decreased of the ratio Y in the toner particle interior relative to the toner particle surface. The value of the ratio Y in the depth direction of the toner particle can be controlled by controlling the conditions for heat treatment of the toner particle as discussed below and the affinity between the silicone segment and the polyester segment.

That is, the value of the ratio Y2 at a depth of 30 nm from the toner particle surface is at least 50% less (preferably from 50% to 95% less, or more preferably from 55% to 80% less) than the value of the ratio Y1 on the toner particle surface.

Furthermore, when X3 is the value of X at a depth of 20 nm from the toner particle surface and Z3 is the value of Z at a depth of 20 nm from the toner particle surface, Y3 (representing X3/Z3) and Y1 above preferably satisfy (Y1− Y3)/Y1≥0.50. That is, the value of the ratio Y3 at a depth of 20 nm from the toner particle surface is preferably at least 50% less (preferably from 50% to 95% less, or more preferably from 55% to 80% less) than the value of the ratio Y1 on the toner particle surface. In this case, the decrease rate in the ratio Y must also be at least 50% at a depth of 20 nm to 30 nm from the toner particle surface.

Furthermore, when X4 is the value of X at a depth of 10 nm from the toner particle surface and Z4 is the value of Z at a depth of 10 nm from the toner particle surface, Y4 (representing X4/Z4) and Y1 preferably satisfy (Y1-Y4)/ Y1≥0.50. That is, the value of the ratio Y4 at a depth of 10 nm from the toner particle surface is preferably at least 50% less (preferably from 50% to 95% less, or more preferably from 55% to 80% less) than the value of the ratio Y1 on the toner particle surface. In this case, the decrease rate in the ratio Y must also be at least 50% at a depth of 10 nm to 30 nm from the toner particle surface. Preferably the ratio Y becomes smaller and smaller moving towards the toner particle interior.

The toner comprises a toner particle containing a binder resin. The binder resin is explained. The binder resin contains a polyester resin in the amount of at least 50 mass % of the binder resin. The polyester resin includes a polyester resin A having a structure represented by formula (1). In addition to the polyester resin A having the structure represented by formula (1), the binder resin may also contain another resin. Examples of the other resin include polyester resins, vinyl resins, polyurethane resins, epoxy resins and phenol resins as well as hybrid resins comprising at least two of these resins linked together.

The content of the polyester resin including the polyester resin A having the structure represented by formula (1) in the binder resin is preferably at least 50 mass %. This content is preferably at least 70 mass %, or more preferably at least 80 mass %. There is no particular upper limit, but preferably it is not more than 100 mass %. It is especially desirable for the binder resin to be a polyester resin. If the principal component of the binder resin is a polyester resin, intermolecular cohesive force can be effectively exerted inside the toner particle, and folding resistance of the fixed image can be obtained. The content of the polyester resin A having the structure represented by formula (1) in the polyester resin is preferably at least 50 mass %, or more preferably at least 70 mass %, or still more preferably at least 80 mass %, or yet more preferably at least 90 mass %. There is no particular upper limit, but preferably it is not more than 100 mass %. It is especially desirable for the polyester resin to be a polyester resin A having the structure represented by formula (1).

The polyester resin A having the structure represented by formula (1) has a silicone segment represented by $-(Si(R^x)_2O)_n-Si(R^x)_2-$. That is, the polyester resin A having the structure represented by formula (1) has a silicone segment represented by formula (1') below.

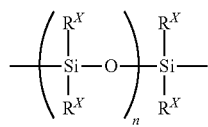
(1')

In formula (1'), $R^x$ and n are as in formula (1). Each $R^x$ independently represents a hydrogen atom, methyl group or phenyl group, and n is the average number of repetitions of the siloxane unit and is an integer of 10 to 80 (preferably 20 to 65). In formulae (1) and (1'), both $R^x$ groups are preferably methyl groups.

The polyester resin A having the structure represented by formula (1) has a silicone segment represented by formula (1') and a polyester segment. The polyester segment of the polyester resin A having the structure represented by formula (1) is preferably an amorphous polyester resin segment. The components constituting the polyester segment of the polyester resin A having the structure represented by formula (1) are described in detail. The following components may be used alone or in combinations of at least two depending on the type and application.

The dibasic carboxylic acid component constituting the polyester segment can be exemplified by the following dicarboxylic acids and their derivatives: benzenedicarboxylic acids and their anhydrides and lower alkyl esters, e.g., phthalic acid, terephthalic acid, isophthalic acid, and phthalic anhydride; alkyl dicarboxylic acids, e.g., succinic acid, adipic acid, sebacic acid, and azelaic acid, and their anhydrides and lower alkyl esters; alkenylsuccinic acids and alkylsuccinic acids having an average value for the number of carbons of from 1 to 50, and their anhydrides and lower alkyl esters; and unsaturated dicarboxylic acids, e.g., fumaric acid, maleic acid, citraconic acid, and itaconic acid, and their anhydrides and lower alkyl esters.

The dihydric alcohol component constituting the polyester segment, on the other hand, can be exemplified by the following: ethylene glycol, polyethylene glycol, 1,2-propanediol, 1,3-propanediol, 1,3-butanediol, 1,4-butanediol, 2,3-butanediol, diethylene glycol, triethylene glycol, 1,5-pentanediol, 1,6-hexanediol, neopentyl glycol, 2-methyl-1,3-propanediol, 2-ethyl-1,3-hexanediol, 1,4-cyclohexanedimethanol (CHDM), hydrogenated bisphenol A, bisphenols given by formula (I-1) and derivatives thereof, and diols given by formula (I-2).

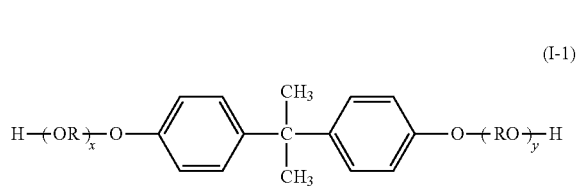
(I-1)

In formula, R represents the ethylene group or propylene group, x and y are each integers equal to or greater than 0, and the average value of x+y is from 0 to 10.

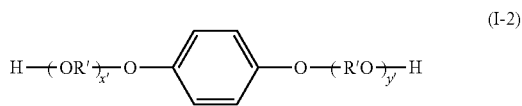
(I-2)

In formula, R' represents the ethylene group or propylene group, x' and y' are each integers equal to or greater than 0, and the average value of x'+y' is from 0 to 10.

Apart from the divalent carboxylic acid component and dihydric alcohol component described above, an at least trivalent carboxylic acid component and an at least trihydric alcohol component may also be included as constituent components of the polyester segment. The at least trivalent carboxylic acid component is not particularly limited, but examples include trimellitic acid, trimellitic anhydride, pyromellitic acid and the like. Examples of the at least trihydric alcohol component include trimethylol propane, pentaerythritol, glycerin and the like.

Apart from the compounds described above, a monovalent carboxylic acid component and a monohydric alcohol component may be included as constituent components of the polyester segment. Specific examples of the monovalent carboxylic acid component include palmitic acid, stearic acid, arachidic acid, behenic acid, cerotic acid, heptacosanoic acid, montanic acid, melissic acid, lacceric acid, tetracontanoic acid and pentacontanoic acid. Examples of the monohydric alcohol include behenyl alcohol, ceryl alcohol, melissyl alcohol and tetracontanol. The content of the polyester segment in the polyester resin A having the structure represented by formula (1) is preferably from 90.0 mass % to 99.5 mass %, or more preferably from 95.0 mass % to 98.0 mass %.

The components constituting the silicone segment of the polyester resin A having the structure represented by formula (1) are explained in detail. The following components may be used alone or in combinations of at least two depending on the type and application. The silicone segment has a structure $(-(Si(R^x)_2O)_n-Si(R^x)_2-)$ represented by formula (1') above. A silicone oil including a functional group that reacts chemically with polyester at the terminus of formula (1') may be used as a component for forming the silicone segment on the polyester resin A having the structure represented by formula (1). Examples of functional groups that react with polyester include hydroxy, carboxy, epoxy and amino groups and the like.

For purposes of controlling reactivity with the polyester, the functional group at the terminus of the silicone oil is preferably a hydroxy group or carboxy group. In terms of valence, the functional group of the silicone oil is preferably monovalent, divalent, or at least trivalent. A divalent silicone oil having functional groups at both ends is preferred. A silicone oil having substituents containing hydroxy groups at both ends of formula (1') is more preferred. An example of a substituent containing a hydroxy group is represented by:

—$(CH_2)_p$—O—$(CH_2)_q$—OH

In the formula, p is an integer from 1 to 3 and q is an integer from 1 to 3.

The method for manufacturing the polyester resin A having the structure represented by formula (1) is not particularly limited, and a known method may be used. For example, the divalent carboxylic acid component and dihydric alcohol component described above may be polymerized together with a silicone oil having a functional group via an esterification reaction or ester-exchange reaction and a condensation reaction to manufacture the polyester resin A having the structure represented by formula (1). The polymerization temperature is not particularly limited, but is preferably in the range of from 180°C to 290° C. A polymerization catalyst such as a titanium catalyst or tin catalyst or zinc acetate, antimony trioxide, germanium dioxide or the like may be used when polymerizing the polyester resin.

The toner particle preferably contains a crystalline polyester resin. Because the crystalline polyester resin is highly compatible with the polyester segments, it has a plasticizing effect during fixing, resulting in good low-temperature fixability. Examples of alcohol components that can be used as raw material monomers of the crystalline polyester resin include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,20-decanediol, 1,11-undecanediol, 1,12-dodecanediol, 1,13-tridecanediol, 1,14-tetradecanediol, 1,18-octadecanediol, 1,20-icosanediol and the like. Of these, a $C_6$-18 aliphatic diol is preferred and a $C_8$-14 aliphatic diol is more preferred from the standpoint of low-temperature fixability and folding resistance. The content of the aliphatic diol is preferably from 80 mol % to 100 mol % of the alcohol components in order to further increase the crystallinity of the crystalline polyester resin.

A polyhydric alcohol component other than the above aliphatic diol may also be included as an alcohol component for producing the crystalline polyester resin. Examples include aromatic diols including bisphenol A alkylene oxide adducts such as 2,2-bis(4-hydroxyphenyl) propane polyoxypropylene adducts and 2,2-bis(4-hydroxyphenyl) propane polyoxyethylene adducts, as well as at least trivalent alcohols such as glycerin, pentaerythritol and trimethylol propane and the like.

Examples of carboxylic acid components that can be used as raw material monomers of the crystalline polyester resin include aliphatic carboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid and 1,18-octadecanedicarboxylic acid, as well as anhydrides thereof and lower alkyl esters of these.

Of these, a $C_{6-18}$ aliphatic dicarboxylic acid is preferred from the standpoint of low-temperature fixability and folding resistance, and a $C_{6-12}$ aliphatic dicarboxylic acid is more preferred. The content of the aliphatic dicarboxylic acid is preferably from 80 mol % to 100 mol % of the carboxylic acid components.

Another carboxylic acid component other than the aforementioned aliphatic dicarboxylic acid may also be included as a carboxylic acid component for producing the crystalline polyester resin. Examples include, but are not limited to, aromatic dicarboxylic acids and at least trivalent aromatic polyvalent carboxylic acids. Aromatic dicarboxylic acids also include aromatic dicarboxylic acid derivatives. Specific examples of aromatic dicarboxylic acids include phthalic acid, isophthalic acid, terephthalic acid and napthalene-2,6-dicarboyxlic acid and anhydrides thereof, and $(C_{1-3})$ alkyl esters of these. The alkyl groups in these alkyl esters may be methyl, ethyl, propyl or isopropyl groups. Examples of at least trivalent polyvalent carboxylic acids include aromatic carboxylic acids such as 1,2,4-benzenetricarboxylic acid (trimellitic acid), 2,5,7-naphthalenetricarboxylic acid and pyromellitic acid, anhydrides thereof, and derivatives of these such as $(C_{1-3})$ alkyl esters and the like. The molar ratio of the alcohol component and carboxylic acid as raw material monomers of the crystalline polyester acid (carboxylic acid component/alcohol component) is preferably from 0.80 to 1.20.

The content of the crystalline polyester resin is preferably from 0.5 to 10.0 mass parts or more preferably from 3.0 to 5.0 mass parts per 100 mass parts of the binder resin. If the content of the crystalline polyester resin is within this range, an effective plasticizing effect can be obtained during fixing, resulting in good low-temperature fixability. Folding resistance is also further improved because the crystalline parts can be effectively distributed on the fixed image surface.

The toner of the present invention can be used as any one of a magnetic one-component toner, a nonmagnetic one-component toner and a nonmagnetic two-component toner. When the toner is used as a magnetic one-component toner, magnetic iron oxide particles are preferably used as a colorant. Examples of the magnetic iron oxide particles contained in the magnetic one-component toner include magnetic iron oxide such as magnetite, maghemite and ferrite, and magnetic iron oxide including other metal oxides; metals such as Fe, Co, and Ni; alloys of these metals with metals such as Al, Co, Cu, Pb, Mg, Ni, Sn, Zn, Sb, Be, Bi, Cd, Ca, Mn, Se, Ti, W, and V, and mixtures thereof. The content of the magnetic iron oxide particles is preferably from 30 parts by mass to 150 parts by mass with respect to 100 parts by mass of the binder resin.

Examples of the colorant for use in a nonmagnetic one-component toner and a nonmagnetic two-component toner are presented hereinbelow. As a black pigment, carbon black such as furnace black, channel black, acetylene black, thermal black and lamp black can be used, and magnetic powder such as magnetite and ferrite can also be used. As a coloring agent suitable for yellow color, pigments or dyes can be used. Examples of the pigments include C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, and 191, and C. I. Vat Yellow 1, 3, and 20. Examples of the dyes include C. I. Solvent Yellow 19, 44, 77, 79, 81, 82, 93, 98, 103, 104, 112, 162, and the like. These are used singly or in combination of two or more.

As a colorant suitable for cyan color, pigments or dyes can be used. Examples of the pigments include C. I. Pigment Blue 1, 7, 15, 15:1, 15:2, 15:3, 15:4, 16, 17, 60, 62, 66, and the like, C. I. Vat Blue 6, and C. I. Acid Blue 45. Examples of the dyes include C. I. Solvent Blue 25, 36, 60, 70, 93, 95, and the like. These are used singly or in combination of two or more. As a colorant suitable for magenta color, pigments or dyes can be used. Examples of the pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, 254, and the like, C. I. Pigment Violet 19, and C. I. Vat Red 1, 2, 10, 13, 15, 23, 29, and 35.

Examples of the magenta dyes include oil-soluble dyes such as C. I. Solvent Red 1, 3, 8, 23, 24, 25, 27, 30, 49, 52, 58, 63, 81, 82, 83, 84, 100, 109, 111, 121, 122, and the like, C. I. Disperse Red 9, C. I. Solvent Violet 8, 13, 14, 21, 27, and the like, C. I. Disperse Violet 1, and the like, and basic dyes such as C. I. Basic Red 1, 2, 9, 12, 13, 14, 15, 17, 18, 22, 23, 24, 27, 29, 32, 34, 35, 36, 37, 38, 39, 40 and the like, C. I. Basic Violet 1, 3, 7, 10, 14, 15, 21, 25, 26, 27, 28, and the like. These are used singly or in combination of two or more. The content of the colorant is preferably from 1 part by mass to 20 parts by mass with respect to 100 parts by mass of the binder resin.

A release agent (wax) may be used to impart releasability to the toner. Examples of the wax are presented hereinbelow. Aliphatic hydrocarbon waxes such as low-molecular-weight polyethylene, low-molecular-weight polypropylene, an olefin copolymer, microcrystalline wax, paraffin wax and Fischer-Tropsch wax; oxidized waxes of aliphatic hydrocarbon waxes such as oxidized polyethylene wax; waxes composed mainly of fatty acid esters such as carnauba wax, behenyl behenate and montanic acid ester wax; and waxes obtained partially or wholly deacidifying fatty acid esters, such as deacidified carnauba wax.

Other examples include saturated linear fatty acids such as palmitic acid, stearic acid and montanic acid; unsaturated fatty acids such as brassidic acid, eleostearic acid and varinaric acid; saturated alcohols such as stearyl alcohol, aralkyl alcohol, behenyl alcohol, carnaubyl alcohol, seryl alcohol and melissyl alcohol; polyhydric alcohols such as sorbitol; fatty acid amides such as linoleic acid amide, oleic acid amide and lauric acid amide; saturated fatty acid bisamides such as methylene bis-stearic acid amide, ethylene bis-caprylic acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyl adipic acid amide and N,N'-dioleyl sebacic acid amide; aromatic bisamides such as m-xylene bis-stearic acid amide and N,N'-distearyl isophthalic acid amide; aliphatic metal salts such as calcium stearate, calcium laurate, zinc stearate and magnesium stearate (commonly referred to as metallic soaps); waxes obtained by grafting aliphatic hydrocarbon waxes by using a vinyl-based comonomer such as styrene and acrylic acid; partially esterified products of fatty acids and polyhydric alcohols such as behenic acid monoglycerides; methyl ester compounds having a hydroxyl group which are obtained by hydrogenation of vegetable oils and the like.

The wax particularly preferable for use in the present invention is an aliphatic hydrocarbon wax. Preferred examples thereof include hydrocarbons having a low molecular weight which are obtained by radical polymerization of an alkylene under a high pressure or polymerization under a low pressure with a Ziegler catalyst or a metallocene catalyst; a Fischer-Tropsch wax synthesized from coal or natural gas; an olefin polymer obtained by thermal decomposition of an olefin polymer having a high molecular weight; a synthetic hydrocarbon wax obtained from a distillation residue of a hydrocarbon obtained by an Arge process from a synthetic gas including carbon monoxide and hydrogen; and a synthetic hydrocarbon wax obtained by hydrogenating such hydrocarbon waxes.

Further, it is more preferable to use a product obtained by fractionation of a hydrocarbon wax by a press wiping method or a solvent method, by using vacuum distillation, or by a fractional crystallization method. In particular, wax synthesized by a method which does not rely on polymerization of an alkylene is preferable in view of the molecular weight distribution thereof. The wax may be added when the toner is produced or when the binder resin is produced. Further, one kind of the waxes may be used singly, or two or more kinds of the waxes may be used in combination. The wax is preferably added in an amount of from 1 part by mass to 20 parts by mass with respect to 100 parts by mass of the binder resin.

A charge control agent may be used in the toner. Known charge control agents can be used, and examples thereof include azo iron compounds, azo chromium compounds, azo manganese compounds, azo cobalt compounds, azo zirconium compounds, chromium compounds of carboxylic acid derivatives, zinc compounds of carboxylic acid derivatives, aluminum compounds of carboxylic acid derivatives, and zirconium compounds of carboxylic acid derivatives. This carboxylic acid derivative is preferably an aromatic hydroxycarboxylic acid. A charge control resin may also be used. One kind or a combination of at least two kinds of charge control resin may be used as necessary. The charge control resin is preferably used in the amount of from 0.1 to 10 mass parts per 100 mass parts of the binder resin.

The toner may be mixed with a carrier and used as a two-component developer. As the carrier, a usual carrier such as ferrite and magnetite, or a resin-coated carrier can be used. Further, a binder-type carrier core in which magnetic powder is dispersed in a resin can also be used.

The resin-coated carrier is composed of a carrier core particle and a coating material which is a resin that covers (coats) the surface of the carrier core particle. Examples of the resin used for the coating material include styrene-acrylic resins such as a styrene-acrylic acid ester copolymer and a styrene-methacrylic acid ester copolymer; acrylic resins such as an acrylic acid ester copolymer and a methacrylic acid ester copolymer; fluorine-including resins such as polytetrafluoroethylene, monochlorotrifluoroethylene polymer and polyvinylidene fluoride; silicone resins; polyester resins; polyamide resins; polyvinyl butyral; and aminoacrylate resins. Other examples include ionomer resins and polyphenylene sulfide resins. These resins can be used singly or in combination.

To improve charging stability, developing performance, flowability and durability, it is desirable to externally add a silica fine powder to the toner particle. The specific surface area of the silica fine powder as measured by the BET method using nitrogen adsorption is preferably from 30 $m^2/g$ to 500 $m^2/g$, or more preferably from 50 $m^2/g$ to 400 $m^2/g$. Preferably from 0.01 to 8.00 mass parts, or more preferably from 0.10 to 5.00 mass parts of the silica fine powder are used per 100 mass parts of the toner particle.

The BET specific surface area of the silica fine powder can be calculated by the BET multipoint method by adsorbing nitrogen gas onto the surface of the silica fine powder using an Autosorb-1 surface area analyzer (Yuasa Ionics), a Gemini 2360/2375 (Micromeritics Instrument Corporation) or a Tristar 3000 (Micromeritics Instrument Corporation). The silica fine powder may also be treated with treatment agents such as unmodified silicone varnish, various kinds of modified silicone varnish, unmodified silicone oil, various kinds of modified silicone oil, silane coupling agents, silane compounds having functional groups or other organosilicon compounds or a combination of different treatment agents as necessary to control the triboelectric charge properties or hydrophobized the powder.

Other external additives may also be added as necessary to the toner. Examples of such external additives include charging aids, conductivity imparting agents, flowability imparting agents, anti-caking agents, and resin fine particles and inorganic fine particles that act as release agents, lubricants and abrasives during heat roller fixing. Examples of charging aids include metal oxides such as titanium oxide, zinc oxide and alumina. Examples of lubricants include polyethylene fluoride powder, zinc stearate powder and polyvinylidene fluoride powder. Examples of abrasives include cerium oxide powder, silicon carbide powder and strontium titanate powder.

The method for manufacturing the toner particle is not particularly limited, and examples include pulverization methods, emulsion aggregation methods, suspension polymerization methods and dissolution suspension methods. A pulverization method is preferred for dispersing the pigment and other toner materials. The toner manufacturing method is explained below using the example of a pulverization method, but the method is not limited thereby. Preferably the toner manufacturing method comprises a step of mixing polyester resin including the polyester resin A having the structure represented by formula (1) with a colorant, crystalline polyester resin and other additives and the like as necessary, a step of melt kneading the mixture, and a step of cooling and solidifying the melt kneaded product and then pulverizing and classifying it as necessary to obtain a toner particle. A wax, a magnetic iron oxide particle and a metal-containing compound may also be added during the melt kneading step.

Examples of the mixer are presented below. Henschel mixer (manufactured by Mitsui Mining Co., Ltd.); SUPER-MIXER (manufactured by Kawata Mfg Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ltd.); and LODIGE MIXER (manufactured by Matsubo Corporation).

Examples of the kneader are presented below. KRC kneader (manufactured by Kurimoto, Ltd.); BUSS Co-kneader (manufactured by Buss AG); TEM-type extruder (manufactured by Toshiba Machine Co., Ltd.); TEX twin-screw kneader (manufactured by The Japan Steel Works, Ltd.); PCM kneader (manufactured by Ikegai Ironworks Corp.); a three-roll mill, a mixing roll mill, and a kneader (manufactured by Inoue Seisakusho Co., Ltd.); KNEADEX (manufactured by Mitsui Mining Co., Ltd.); MS-type pressurizing kneader and KNEADER-RUDER (manufactured by Moriyama Works); and Banbury mixer (manufactured by Kobe Steel, Ltd.).

Examples of the pulverizer are presented below. COUNTER JET MILL, MICRON JET, and INNOMIZER (manufactured by Hosokawa Micron Corporation); IDS type mill and PJM jet pulverizer (manufactured by Nippon Pneumatic Mfg. Co., Ltd.); CROSS JET MILL (manufactured by Kurimoto, Ltd.); ULMAX (manufactured by Nisso Engineering Co., Ltd.); SK Jet-O-Mill (manufactured by Seishin Enterprise Co., Ltd.); KRYPTRON (manufactured by EARTHTECHNICA Co, Ltd.); TURBO MILL (manufactured by Turbo Kogyo Co., Ltd.); and SUPER-ROTOR (manufactured by Nisshin Engineering Inc.).

Examples of the classifier are presented below. CLASSIEL, MICRON CLASSIFIER, and SPEDIC CLASSIFIER (manufactured by Seishin Enterprise Co., Ltd.); TURBO CLASSIFIER (manufactured by Nisshin Engineering Inc.); MICRON SEPARATOR, TURBOPLEX (ATP), and TSP SEPARATOR, (manufactured by Hosokawa Micron Corporation); ELBOW JET (manufactured by Nittetsu Mining Co., Ltd.); DISPERSION SEPARATOR (manufactured by Nippon Pneumatic Mfg. Co., Ltd.); and YM MICRO CUT (manufactured by Yaskawa & Co., Ltd.).

By heat treating the toner particle during the process of obtaining the toner particle, it is possible to form a gradient whereby the amount of silicone segments decreases from the toner surface to the toner interior. For example, the toner particle obtained by the pulverization method can be subjected to heat treatment. The toner manufacturing step preferably includes a step of heat treating the toner particle. Because the silicone segment has low affinity for a polyester unit, it flows so as to be extruded onto the toner particle surface in a flow field created by heat treatment. As a result, the amount of silicone segments near the toner particle surface is likely to increase while the amount of silicone segments in the toner particle interior is likely to decrease.

For example, surface treatment can be performed by hot air by using the surface treatment apparatus shown in the FIGURE. A mixture quantitatively supplied by a raw material quantitative supply means 1 is introduced to an introduction pipe 3 installed on the vertical line of the raw material supply means by a compressed gas adjusted by a compressed gas adjustment means 2. The mixture that has passed through the introduction pipe is uniformly dispersed by a conical projection-shaped member 4 provided at the central portion of the raw material supply means, and is introduced into the radially extending eight-direction supply pipes 5 to be introduced into a treatment chamber 6 where the heat treatment is performed. At this time, the flow of the mixture supplied to the treatment chamber is regulated by a regulation means 9 provided in the treatment chamber for regulating the flow of the mixture. For this reason, the mixture supplied to the treatment chamber is cooled after being heat-treated while swirling in the treatment chamber.

Hot air for heat-treating the supplied mixture is supplied from the hot air supply means 7, and is swirled and introduced into the treatment chamber by a swirling member 13 for swirling the hot air. As a specific configuration, the swirling member 13 for swirling the hot air may have a plurality of blades, and the swirling of the hot air can be controlled by the number and angle of the blades. The temperature of the hot air supplied into the treatment chamber at the outlet of the hot air supply means 7 is preferably 100° C. to 300° C. A temperature of 165° C. to 190° C. is more preferred. If the temperature at the outlet of the hot air supply means is within this range, it is possible to prevent fusion and coalescence of toner particle due to excess heating of the mixture. This also promotes fluidization of the silicone segments in the toner interior, facilitating the creation of a gradient in the amount of silicone segments from the toner surface to the toner interior.

Further, the heat-treated toner particles subjected to the heat treatment are cooled by the cold air supplied from a cold air supply means 8 (8-1, 8-2, 8-3), and the temperature supplied from the cold air supply means 8 is preferably −20° C. to 30° C. Where the temperature of the cold air is within the above range, the heat-treated toner particles can be efficiently cooled, and fusion or coalescence of the heat-treated toner particles can be prevented. The absolute moisture content of the cold air is preferably from 0.5 g/m$^3$ to 15.0 g/m$^3$. Next, the cooled heat-treated toner particles are collected by a collection means 10 at the lower end of the treatment chamber. A blower (not shown) is provided at the end of the collection means and configured to ensure suction and transportation of the toner particles.

Further, a powder particle supply port 14 is provided such that the swirling direction of the supplied mixture and the swirling direction of the hot air are the same, and the collection means 10 of the surface treatment apparatus is provided on the outer periphery of the treatment chamber so as to maintain the swirling direction of the swirled powder particles. Furthermore, the cold air supplied from the cold air supply means 8 is supplied horizontally and tangentially from the outer peripheral portion of the apparatus to the peripheral surface of the treatment chamber. The swirling direction of the toner particles supplied from the powder supply port, the swirling direction of the cold air supplied from the cold air supply means, and the swirling direction of the hot air supplied from the hot air supply means are all the same. Therefore, no turbulent flow occurs in the treatment chamber, the swirling flow in the apparatus is enhanced, strong centrifugal force is applied to the toner particles, and the dispersibility of the toner particles is further improved. As a result, a toner including few coalesced particles and having uniform shape can be obtained.

The resulting toner particle may be used as is as a toner. The toner particle may also be mixed with an external additive in a mixer such as a Henschel mixer to obtain a toner. Mixing with the external additive may be performed either before or after the toner particle is heat treated, or it may be performed both before and after heat treatment.

The methods for measuring the various physical properties are described next.

Measuring Glass Transition Temperature (Tg)

The Tg of the resin or toner is measured in accordance with ASTM D3418-82 using a Q2000 differential scanning calorimeter (TA Instruments). The melting points of indium and zinc are used for temperature correction of the device detector, and the heat of fusion of indium is used to correct the calorific value. Specifically, about 3 mg of sample is weighed exactly, placed in an aluminum pan and measured under the following conditions using an empty aluminum pan for reference.

Ramp rate: 10° C./min
Measurement start temperature: 30° C.
Measurement end temperature: 180° C.

Measurement is performed at a ramp rate of 10° C./minute within the measurement range of 30° C. to 180°C. After the temperature reaches 180° C. it is maintained for 10 minutes, then reduced to 30° C., and then raised again. A change in specific heat is obtained within the temperature range of 30° C. to 100° C. during this second temperature rise. The point of intersection between the differential thermal curve and a line midway between the baselines before and after the occurrence of the specific heat change is defined as the glass transition temperature (Tg) of the sample.

Method for Measuring Softening Point Tm

The softening point is measured using a "Flowtester CFT-500D Flow Property Evaluation Instrument" (Shimadzu Corporation), which is a constant-load extrusion-type capillary rheometer, in accordance with the manual provided with the instrument. With this instrument, while a constant load is applied by a piston from the top of the measurement sample, the measurement sample filled in a cylinder is heated and melted and the melted measurement sample is extruded from a die at the bottom of the cylinder; a flow curve showing the relationship between piston stroke and temperature can be obtained from this. The "melting temperature by the ½ method", as described in the manual provided with the "Flowtester CFT-500D Flow Property Evaluation Instrument", is used as the softening point. The melting temperature by the ½ method is determined as follows.

First, ½ of the difference between the piston stroke Smax at the completion of outflow and the piston stroke Smin at the start of outflow is determined (this value is designated as X, where X=(Smax−Smin)/2). The temperature in the flow curve when the piston stroke in the flow curve reaches the sum of X and Smin is the melting temperature by the ½ method. The measurement sample used is prepared by subjecting approximately 1.3 g of the sample to compression molding for 60 seconds at 10 MPa in a 25° C. environment using a tablet compression molder (for example, NT-100H, NPa System Co., Ltd.) to provide a cylindrical shape with a diameter of approximately 8 mm. The measurement conditions with the CFT-500D are as follows.

test mode: ramp-up method
start temperature: 50° C.
saturated temperature: 200° C.
measurement interval: 1.0° C.
ramp rate: 4.0° C./min
piston cross section area: 1.000 cm$^2$
test load (piston load): 10.0 kgf/cm$^2$ (0.9807 MPa)
preheating time: 300 seconds
diameter of die orifice: 1.0 mm
die length: 1.0 mm Measuring Weight-average Particle Diameter (D4) of Toner Particle Using a Multisizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multisizer 3 Version 3.51 software (Beckman Coulter, Inc.) for setting measurement conditions and analyzing measurement data, measurement is performed with 25,000 effective measurement channels, and the measurement data are analyzed to calculate the weight-average particle diameter (D4) of the toner particle. The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 uA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm. The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counter-clockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner particle is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner dispersed therein is dripped with a pipette into the round-bottomed beaker of (1) set on the sample stand, and adjusted to a measurement concentration of about 5%. Measurement is then performed until the number of measured particles reaches 50,000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software.

Measuring Amount X and Ratio Y of Silicone Segments
Pre-Treatment

An aqueous sucrose solution of 20.7 g of sucrose (Kishida Chemical) dissolved in 10.3 g of ion-exchange water is placed in a 30 ml glass vial (such as a NICHIDEN RIKA-GLASS CO., LTD. VCV-30, external diameter 35 mm, height 70 mm) and thoroughly mixed with 6 ml of the surfactant Contaminon N (a pH 7 neutral detergent for cleaning precision measurement instruments, comprising a nonionic surfactant, an anionic surfactant and an organic builder, manufactured by Wako Pure Chemical Industries, Ltd.) to prepare a dispersion.

1.0 g of toner is added to this vial and left until the toner precipitates naturally to prepare a pre-treatment dispersion. This dispersion is shaken for five minutes at 200 rpm in a shaker (YS-8D, Yayoi Co., Ltd.) to detach the external additive particles from the toner particle surface. This is then centrifuged for 30 minutes at 3700 rpm with a centrifuge to separate the detached external additive particles, and the toner particle is collected by suction filtration and dried.

Measuring Amount of Silicone Segment by X-Ray Photoelectron Spectrometry (XPS)

A powder of the measured and pre-treated toner particle is fixed with an indium sheet to the sample stand of the XPS unit and measured under the following conditions.

Measurement unit: Ulvac-Phi, Inc. PHI 5000 VersaProbe II
Irradiation beam: Al-Kα beam
Output: 100 μm, 25 W, 15 kV
Photoelectron uptake angle: 45°
Pass energy: 58.70 eV
Step size: 0.125 eV
Measured elements: All detected elements
Measurement range: Powder 300 μm×200 μm
(Sputter Conditions)
Sputter ion gun: Ar gas cluster ion beam
Acceleration voltage: 20 kV
Sputter region: 5 mm×5 mm
However, sputtering is not used when analyzing the toner particle surface.

The ratio obtained under these conditions for the number of silicon atoms derived from (attributable to) silicone segments as a percentage of the total number of atoms (×100) is given as the amount X (atom %) of silicone segments. When there is residual silica from external additives that were not detached by pre-treatment, the peaks of the silica and the silicone segments are distinguished from each other by peak separation of the Si2p photoelectron spectrum and used to calculate the number of silicon atoms derived from the silicone segment.

The number of carbon atoms attributable to ester bonds is also calculated by peak separation of the C1s photoelectron spectrum, and the ratio (×100) of the number of carbon atoms relative to the total number of atoms is given as the ratio of the number of carbon atoms (Z) derived from (attributable to) ester bonds of the polyester resin as a percentage of the total number of atoms. The ratio Y is the amount X of silicone segments determined above divided by the Z (X/Z). The amount X/Z on the toner particle surface (that is X1/Z1) is designated as ratio Y1.

Regarding the "depth" from the toner particle surface, the relationship between sputter time and sputter depth is calculated using a polyester film with a known film thickness sputtered under the above conditions. Based on the calculated relationship, the toner particle powder is sputtered under the above conditions for the time required to reach the desired depth. XPS analysis is then performed under the above conditions, and the value of the ratio Y (that is, Y2, Y3 and Y4) is calculated at depths of 10 nm, 20 nm and 30 nm from the toner particle surface.

Measuring Content of Polyester Resin and Crystalline Polyester Resin in Toner

Using differences in solubility in solvents, it is possible to separate these materials from the toner as described below and determine the contents thereof.

First separation: The toner is dissolved in 23° C. methyl ethyl ketone (MEK) and separated into a soluble component (binder resin) and an insoluble component (crystalline polyester resin, release agent, colorant, inorganic fine particle, etc.). The binder resin separated as the soluble component is dried to thoroughly remove the solvent, after which the mass is measured to determine the content of the binder resin. Next, the monomers contained in the binder resin component are identified by pyrolysis gas chromatography-mass spectrometry at 590° C., and the molar ratio of each monomer is calculated by $^{1}$H-NMR to determine the content of the polyester resin in the binder resin.

Second separation: The insoluble component obtained from the first separation (crystalline polyester resin, release agent, colorant, inorganic fine particle, etc.) is dissolved in 100° C. MEK, and separated into a soluble component (crystalline polyester resin, release agent) and an insoluble component (colorant, inorganic fine particle).

Third separation: The soluble component obtained from the second separation (crystalline polyester resin, release agent) is dissolved in 23° C. chloroform, and the crystalline polyester resin is separated out as a soluble component. This is thoroughly dried to remove the solvent, and the content of the crystalline polyester resin can then be determined by performing mass spectrometry.

Confirming Structure of Polyester Resin A Having Structure Represented by Formula (1)

The following methods are used to confirm the structure of the polyester resin A having the structure represented by formula (1). The hydrocarbon group of $R^x$ and the silicone segment in the formula (1) are confirmed by $^{13}$C-NMR and solid $^{29}$Si-NMR. ($^{13}$C-NMR measurement conditions)
  instrument: JNM-ECX500II, JEOL RESONANCE
  sample tube: 3.2 mmΦ
  sample: deuterochloroform-soluble matter from sample for NMR measurement
  measurement temperature: room temperature
  pulse mode: CP/MAS
  measurement nucleus frequency: 123.25 MHz ($^{13}$C)
  reference substance: adamantane (external reference: 29.5 ppm)
  sample spinning rate: 20 kHz
  contact time: 2 ms
  delay time: 2 s
  number of scans: 1024

In this method, the hydrocarbon group represented by the $R^x$ in formula (1) is identified by the presence/absence of signal originating with, e.g., the silicon atom-bonded methyl group (Si—CH$_3$) or phenyl group (Si—C$_6$H$_5$).

The specific measurement conditions for the solid-state $^{29}$Si-NMR are as follows.
  instrument: JNM-ECX5002 (JEOL RESONANCE)
  temperature: room temperature
  measurement method: DD/MAS method, $^{29}$Si, 45°
  sample tube: zirconia 3.2 mmΦ
  sample: filled as a powder into the sample tube
  sample spinning rate: 10 kHz
  relaxation delay: 180 s
  scans: 2000

EXAMPLES

The present invention is explained in detail below based on examples, but the invention is not limited by these examples. Unless otherwise specified, parts in the formulations below are based on mass.

Manufacturing Example of Polyester Resin (Binder Resin 1) Having Structure Represented by Formula (1)
  Bisphenol A ethylene oxide (2.2-mol adduct) 50.0 moles
  Bisphenol A propylene oxide (2.2-mol adduct) 50.0 moles
  Terephthalic acid 90.0 moles
  Trimellitic anhydride 10.0 moles 97 parts of these monomers for forming the polyester segment and 4 parts of a silicone oil (KF-6001, Shin-Etsu Chemical Co., Ltd.) having hydroxy groups at both ends were mixed in a 5-liter autoclave together with 500 ppm of titanium tetrabutoxide. KF-6001 yields a structure in which all of R groups are methyl groups and n is 38 in formula (1). A reflux cooler, a moisture separator, an N$_2$ gas introduction pipe, a thermometer and a stirrer were then attached, and N$_2$ gas was introduced into the autoclave as a polycondensation reaction was performed at 230° C. After completion of the reaction the contents were removed, cooled, and pulverized to obtain a binder resin 1, which is a polyester resin A having the structure represented by formula (1).

Manufacturing Example of Polyester Resin (Binder Resin 2)
  Bisphenol A ethylene oxide (2.2-mol adduct) 50.0 moles
  Bisphenol A propylene oxide (2.2-mol adduct) 50.0 moles
  Terephthalic acid 90.0 moles
  Trimellitic anhydride 10.0 moles These materials for constituting the polyester unit were mixed in a 5-liter autoclave together with 500 ppm of titanium tetrabutoxide. A reflux cooler, a moisture separator, an N$_2$ gas introduction pipe, a thermometer and a stirrer were then attached, and N$_2$ gas was introduced into the autoclave as a polycondensation reaction was performed at 230° C. After completion of the reaction the contents were removed, cooled, and pulverized to obtain a binder resin 2, which is a polyester resin.

Manufacturing Example of Styrene Acrylic Resin (Binder Resin 3)
  Styrene 70.0 moles
  2-ethylhexyl acrylate 30.0 moles A mixture of 100 parts of these monomers for constituting the styrene acrylic resin and 5 parts of benzoyl peroxide as a polymerization initiator were dripped over the course of four hours into 200 parts of heated xylene. Polymerization was then completed under reflux with xylene, and the solvent was distilled and removed under reduced pressure. After completion of the reaction the contents were removed from the reactor, cooled, and pulverized to obtain a binder resin 3, which is a styrene acrylic resin.

Manufacturing Example of Crystalline Polyester Resin 100.0 moles of 1,10-decanedicarboxylic acid as a carboxylic acid monomer and 100.0 moles of 1,9-nonanediol as an alcohol monomer were placed in a reaction tank equipped with a nitrogen introduction pipe, a dewatering pipe, a stirrer and a thermocouple. The temperature was raised to 140° C. under stirring, and the mixture was heated to 140° C. in a nitrogen atmosphere and reacted for eight hours as the water was distilled off under normal pressure. 0.57 parts of tin dioctylate were then added, and the mixture was reacted while being heated to 200° C. at a rate of 10° C./hour. Once 200° C. was reached this was reacted for two hours, after which the inside of the reaction tank was depressurized to not more than 5 kPa and the molecular weight was monitored as the mixture was reacted at 200° C. to obtain a crystalline polyester resin. The resulting crystalline polyester resin exhibited a clear endothermic peak in DSC measurement.

Manufacturing Example of Toner 1
  Binder resin 1 100 parts
  Binder resin 2 20 parts
  Crystalline polyester resin 5.0 parts
  Fischer-Tropsch wax (melting point 90° C.) 6.0 parts
  C.I. pigment blue 15:3 4.0 parts These materials were pre-mixed in a Henschel mixer and then melt kneaded at 160° C. with a twin-screw extruder. The kneaded product was cooled, crushed with a hammer mill and then finely pulverized with a Turbo mill. The finely pulverized product was classified with a multi-division classifier using the Coanda effect to obtain a toner base particle. Using a Henschel mixer, 1.0 part of a hydrophobically treated silica fine particle (specific surface area 140 m$^2$/g as measured by nitrogen adsorption using the BET method) was added to 100 parts of the toner base particle, and this was then heat treated with the surface treatment apparatus shown in the FIGURE to obtain a heat treated toner particle. The operating conditions were a feed rate of 5 kg/h, a hot air temperature of 180° C., a hot air flow rate of 6 m$^3$/minute, a cool air temperature of −5° C., a cool air flow rate of 4 m$^3$/minute, a blower air volume of 20 m$^3$/minute and an injection air flow rate of 1 m$^3$/minute.

The resulting heat-treated toner particle was classified with an Elbow jet inertial classification system to obtain a heat-treated toner with a weight-average particle diameter of 6.0 μm. Using a Henschel mixer, 1.0 part of a hydrophobically treated silica fine particle (specific surface area 140 m$^2$/g as measured by nitrogen adsorption using the BET method) was added to 100 parts of the heat-treated toner particle, and this was mixed with the Henschel mixer and sieved with a 150 μm mesh to obtain a toner 1 with a negative triboelectric charge. The toner 1 had a Tm of 135° C. and a Tg of 56° C.

Manufacturing Example of Magnetic Core Particle
Step 1: Weighing and Mixing Step
  Fe$_2$O$_3$ 62.7 parts
  MnCO$_3$ 29.5 parts
  Mg(OH)$_2$ 6.8 parts
  SrCO$_3$ 1.0 parts The materials listed above were weighed out as ferrite starting materials in the compositional ratio indicated above. This was followed by mixing and pulverization for five hours using a dry vibrating mill and stainless steel beads having a diameter of ⅛ inch.

Step 2: Pre-Firing Step
The resulting pulverized material was converted into approximately 1 mm-square pellets using a roller compactor. Coarse powder was removed from these pellets using a vibrating screen having an aperture of 3 mm; the fines were then removed using a vibrating screen having an aperture of 0.5 mm; and firing was thereafter carried out in a burner-type firing furnace under a nitrogen atmosphere (0.01 volume % oxygen concentration) for four hours at a temperature of 1000° C. to produce a prefired ferrite. The composition of the obtained prefired ferrite was as follows.

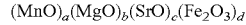

$(MnO)_a(MgO)_b(SrO)_c(Fe_2O_3)_d$

In the formula, a=0.257, b=0.117, c=0.007, d=0.393.

Step 3: Pulverization Step
The obtained prefired ferrite was pulverized with a crusher to about 0.3 mm, followed by the addition of 30 parts of water per 100 parts of the prefired ferrite and pulverization for one hour with a wet ball mill using zirconia beads with a diameter of ⅛ inch. The obtained slurry was pulverized for four hours with a wet ball mill using alumina beads having a diameter of 1/16 inch to obtain a ferrite slurry (fine pulverizate of the prefired ferrite).

Step 4: Granulation Step
1.0 parts of an ammonium polycarboxylate as a dispersing agent and 2.0 parts of polyvinyl alcohol as a binder were added to the ferrite slurry per 100 parts of the prefired ferrite, followed by granulation into spherical particles using a spray dryer (manufacturer: Ohkawara Kakohki Co., Ltd.). The particle size of the obtained particles was adjusted followed by heating for two hours at 650° C. using a rotary kiln to remove the organic component, e.g., the dispersing agent and binder.

Step 5: Firing Step
In order to control the firing atmosphere, the temperature was raised over two hours using an electric furnace from room temperature to a temperature of 1300° C. under a nitrogen atmosphere (1.00 volume % oxygen concentration), and firing was then performed for four hours at a temperature of 1150° C. This was followed by reducing the temperature to a temperature of 60° C. over four hours, returning to the atmosphere from the nitrogen atmosphere, and removal at a temperature of 40° C. or below.

Step 6: Selection Step
The aggregated particles were broken up; the low magnetic force product was then removed using a magnetic force classifier; and the coarse particles were removed by sieving on a sieve with an aperture of 250 μm to obtain magnetic core particles having a 50% particle diameter on a volume basis of 37.0 μm.

Manufacturing Example of Coating Resin
  Cyclohexyl methacrylate 26.8 mass %
  Methyl methacrylate 0.2 mass %
  Methyl methacrylate macromonomer 8.4 mass % (macromonomer with weight-average molecular weight of 5000 having methacryloyl group at one end)
  Toluene 31.3 mass %
  Methyl ethyl ketone 31.3 mass %
  Azobisisobutyronitrile 2.0 mass %

Of these materials, the cyclohexyl methacrylate, methyl methacrylate, methyl methacrylate macromonomer, toluene and methyl ethyl ketone were placed in a 4-necked separable flask with an attached reflux cooler, thermometer, nitrogen introduction pipe and stirrer. Nitrogen gas was introduced to create a sufficient nitrogen atmosphere inside the separable flask, after which the temperature was raised to 80° C., the azobisisobutyronitrile was added, and the mixture was refluxed and polymerized for five hours. Hexane was poured into the reaction product to precipitate a copolymer. The resulting precipitate was filtered out and vacuum dried to obtain a coating resin. 30 parts of the coating resin were dissolved in a mixed solvent of 40 parts of toluene and 30 parts of methyl ethyl ketone to obtain a resin solution (solids concentration 30%).

Preparing Coating Resin Solution
  Resin solution (solids concentration 30%) 33.3 mass %
  Toluene 66.4 mass %
  Carbon black (Regal 330, Cabot Corp.) 0.3 mass % (number-average particle diameter of primary particles: 25 nm, nitrogen adsorption specific surface area: 94 m$^2$/g, DPB oil absorption: 75 ml/100 g)

These materials were placed in a paint shaker and dispersed for one hour with zirconia beads 0.5 mm in diameter. The resulting dispersion was filtered with a 5.0 μm membrane filter to obtain a coating resin solution.

Manufacturing Example of Magnetic Carrier
The coating resin solution and the magnetic core particle were placed in a vacuum degassing-type kneader maintained at room temperature (the loaded amount of the coating resin solution was 2.5 parts of the resin component per 100 parts of the magnetic core particle). After being loaded, this was stirred for 15 minutes at a rotation speed of 30 rpm, and once at least a certain amount (80%) of the solvent had evaporated, the temperature was raised to 80° C. under reduced pressure mixing, the toluene was distilled off over the course of two hours, and the mixture was cooled. The low magnetic component of the resulting magnetic carrier was sorted out with a magnetic dressing, and the carrier was passed through a 70 μm mesh and then classified with an air classifier to obtain a magnetic carrier with a 50% particle diameter of 38.2 μm based on volume distribution.

Manufacturing Example of Developer 1

The toner 1 and the magnetic carrier were mixed under conditions of 0.5 s$^{-1}$, rotation time five minutes with a V-type mixer (V-10, TOKUJU CORPORATION) so that the toner 1 constituted 10 parts per 90 parts of the magnetic carrier to obtain a developer 1. The resulting developer 1 was evaluated as follows.

Evaluating Release Properties (Paper Sticking to Fixing Member)

An imageRUNNER ADVANCE C5051 printer made by Canon for digital commercial printing was used as the image-forming apparatus and modified so that the fixing temperature and process speed could be set at will. The cyan station developing device of this modified apparatus was filled with the developer 1, the direct current voltage VDC of the developer carrying member, the charging voltage VD of the electrostatic latent image bearing member and the laser power were adjusted so as to obtain the desired toner laid-on level on the paper or the electrostatic latent image bearing member, and the following evaluation was performed.

Paper: CS-680 (68.0 g/m$^2$, sold by Canon Marketing Japan Inc.)
    Toner laid-on level on paper: 1.20 mg/cm$^2$
    Evaluation image: 2 cm×29 cm image placed at 5 mm margin at leading edge of above A4 paper
    Fixing test environment: High-temperature high-humidity environment (30° C./80% RH, hereunder "H/H")

With the process speed set to 450 mm/sec, the fixing temperature control was adjusted, fixed images were output, wraparound of the fixed image was observed visually, and the highest temperature at which no wraparound occurred was designated the separable fixing temperature. The separable fixing temperature was evaluated according to the following standard.

Evaluation Standard
    A: Separable fixing temperature at least 130° C.
    B: Separable fixing temperature at least 125° C. but less than 130° C.
    C.: Separable fixing temperature at least 120° C. but less than 125° C.
    D: Separable fixing temperature less than 120° C.

Folding Resistance

A temperature 20° C. higher than the minimum fixing temperature was set as the appropriate fixing temperature, a solid image with a toner laid-on level of 0.90 mg/cm$^2$ was formed on one side of A4 paper using plain GF-C209 paper for color copiers and printers (A4 209 g/cm$^2$, Canon Marketing Japan Inc.), and the recording paper with the solid image formed thereon was folded in a cross. The folded image part was rubbed 5 times back and forth with Sylbon paper under a load of 4.9 kPa, and the area ratio of the peeled part of the image was calculated to evaluate folding resistance.

Evaluation Standard
    A: Area ratio of peeled part is less than 5%
    B: Area ratio of peeled part is at least 5% and less than 10%
    C: Area ratio of peeled part is at least 10% and less than 20%
    D: Area ratio of peeled part is at least 20%

Evaluating Low-temperature Fixability

An imageRUNNER ADVANCE C5051 printer made by Canon for digital commercial printing was used as the image-forming apparatus and modified so that the fixing temperature and process speed could be set at will. The cyan station developing device of this modified apparatus was filled with the developer 1, the direct current voltage VDC of the developer carrying member, the charging voltage VD of the electrostatic latent image bearing member and the laser power were adjusted so as to obtain the desired toner laid-on level on the paper or the electrostatic latent image bearing member, and the following evaluation was performed.

Paper: CS-680 (68.0 g/m$^2$, sold by Canon Marketing Japan Inc.)
    Toner laid-on level on paper: 0.90 mg/cm$^2$
    Evaluation image: 10 cm$^2$ image disposed in center of A4 paper
    Fixing test environment: Low-temperature low-humidity environment (15° C./10% RH, hereunder "L/L")

With the process speed set to 450 mm/sec, the fixing temperature was adjusted, fixed images were output, and the condition of the fixed images was evaluated visually.

Evaluation Standard
    A: Fixing possible at temperature range of not more than 115° C.
    B: Fixing possible at temperature range of above 115° C. and not more than 120° C.
    C: Fixing possible at temperature range of above 120° C. and not more than 125° C.
    D: Fixing only possible at temperature range above 125° C.

The developer 1 received a grade of A in all of the above evaluations.

Examples 2 to 7

Manufacturing Examples of Toners 2 to 7

Toners 2 to 7 were obtained as in the manufacturing example of the toner 1 except that the type of the binder resin and the amount of the crystalline polyester resin were changed, and the toner heat treatment conditions were changed so that the amount X1 of silicone segments and the ratio Y were as shown in Table 1. The heat treatment conditions were changed as follows. In the case of the toner 2, the hot air temperature was set at 178° C. The hot air temperature was set at 175° C. in the case of the toners 3 and 4, at 170° C. in the case of the toners 5 and 6, and at 170° C. in the case of the toner 7. The other heat treatment conditions were the same as for the toner 1.

TABLE 1

|  | Binder resin No. 1 Parts | Binder resin No. 2 Parts | Binder resin No. 3 Parts | Crystalline polyester resin Content (parts) | Tg ° C. | Tm ° C. | Amount X1 of silicone segments Atom % | Ratio Y decrease rate Decrease rate (%) @ depth |
|---|---|---|---|---|---|---|---|---|
| Toner 1 | 100 | 0 | 20 | 4.2 | 56 | 135 | 8.0 | 65%, 10 nm |
| Toner 2 | 100 | 0 | 0 | 5.0 | 55 | 130 | 10.0 | 60%, 10 nm |
| Toner 3 | 50 | 50 | 0 | 5.0 | 58 | 133 | 5.0 | 65%, 20 nm |

TABLE 1-continued

|  | Binder resin No. 1 Parts | Binder resin No. 2 Parts | Binder resin No. 3 Parts | Crystalline polyester resin Content (parts) | Tg °C. | Tm °C. | Amount X1 of silicone segments Atom % | Ratio Y decrease rate Decrease rate (%) @ depth |
|---|---|---|---|---|---|---|---|---|
| Toner 4 | 100 | 0 | 0 | 5.0 | 55 | 130 | 5.0 | 60%, 20 nm |
| Toner 5 | 100 | 0 | 0 | 5.0 | 55 | 130 | 3.0 | 60%, 30 nm |
| Toner 6 | 100 | 0 | 0 | Not contained | 56 | 130 | 3.0 | 60%, 30 nm |
| Toner 7 | 100 | 0 | 0 | 5.0 | 55 | 130 | 2.5 | 50%, 30 nm |

In Tables 1 and 3, the "Content" of the "Crystalline polyester resin" is the number of parts per 100 parts of the binder resin. The "Ratio Y decrease rate" represents the decrease rate in the value of the ratio Y at the depth shown in Table 1 from the toner particle surface in comparison with the ratio Y1 at the toner particle surface. In the case of the toners 1 and 2, the ratio Y decrease rate was constantly at least 50% at depths of 10 nm to 30 nm from the toner particle surface. In the case of the toners 3 and 4, the ratio Y decrease rate was constantly at least 50% at depths of 20 nm to 30 nm from the toner particle surface.

Manufacturing Examples of Developers 2 to 7

As shown in Table 2, developers 2 to 7 were obtained as in the manufacturing example of the developer 1 using the respective toners. These were also evaluated in the same way as the developer 1. The evaluation results are shown in Table 2.

TABLE 2

| Example No. | Toner No. | Developer No. | Release properties | Folding resistance | Low-temperature fixability |
|---|---|---|---|---|---|
| 1 | 1 | 1 | A 132° C. | 3% | A 114° C. |
| 2 | 2 | 2 | A 134° C. | 1% | A 111° C. |
| 3 | 3 | 3 | B 128° C. | 0% | A 113° C. |
| 4 | 4 | 4 | B 128° C. | 7% | A 111° C. |
| 5 | 5 | 5 | C 123° C. | 9% | A 112° C. |
| 6 | 6 | 6 | C 121° C. | 7% | C 124° C. |
| 7 | 7 | 7 | C 123° C. | 15% | A 112° C. |

Comparative Examples 1 and 2

Manufacturing Examples of Toners 8 and 9

Toners 8 and 9 were obtained as in the manufacturing example of the toner 1 except that the binder resin was changed as shown in Table 3 and the toner heat treatment conditions were changed so that the amount X1 of the silicone segments and the ratio Y were as shown in Table 3. The heat treatment conditions were changed as follows. In the case of the toners 8 and 9, the hot air temperature was set at 160° C., and the other heat treatment conditions were the same as the heat treatment conditions for the toner 1.

TABLE 3

|  | Binder resin No. 1 Parts | Binder resin No. 2 Parts | Binder resin No. 3 Parts | Crystalline polyester resin Content (parts) | Tg °C. | Tm °C. | Amount X1 of silicone segments Atom % | Ratio Y decrease rate Decrease rate (%) @ depth |
|---|---|---|---|---|---|---|---|---|
| Toner 8 | 100 | 0 | 0 | 5.0 | 55 | 128 | 4.5 | 10%, 30 nm |
| Toner 9 | 0 | 100 | 0 | 5.0 | 57 | 134 | — | — |

Manufacturing Examples of Developers 8 and 9

Developers 8 and 9 were obtained as in the manufacturing example of the developer 1 using the respective toners as shown in Table 4. These were then evaluated in the same way as the developer 1, with the results shown in Table 4. Because the amount of silicone segments decreased little from the toner surface to the toner interior in Comparative Example 1, the folding resistance rank was D due to decreased cohesive force in the toner interior. In Comparative Example 2, the release properties rank was D because no polyester resin A having the structure represented by formula (1) was used.

TABLE 4

| Comparative Example No. | Toner No. | Developer No. | Release properties | Folding resistance | Low-temperature fixability |
|---|---|---|---|---|---|
| 1 | 8 | 8 | B 129° C. | D 30% | A 111° C. |
| 2 | 9 | 9 | D 115° C. | A 0% | A 113° C. |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-063373, filed Mar. 31, 2020, and Japanese Patent Application No. 2021-032708, filed Mar. 2, 2021, which are hereby incorporated by reference herein in their entirety.

What is claimed is:

1. A toner, comprising:
   a toner particle containing a binder resin;
   the binder resin containing a polyester resin in an amount of at least 50 mass % of the binder resin; and the polyester resin including a polyester resin A having a structure represented by formula (1)

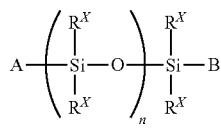
(1)

where $R^x$ is independently a hydrogen atom, methyl group or phenyl group,

A represents a polyester segment,

B represents a polyester segment or any functional group selected from the group consisting of —$R^{20}$OH, —$R^{20}$COOH,

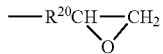

and —$R^{20}NH_2$, $R^{20}$ represents a single bond or $C_1$-4 alkylene group, and the average number of repetitions n is 10 to 80, wherein $$Y1=X1/Z1 \quad (2)$$

$$Y2=X2/Z2 \quad (3)$$

$$(Y1-Y2)/Y1 \geq 0.50 \quad (4)$$

X1 is 0.5 to 20.0 atom % in analysis of the toner particle with an X-ray photoelectron spectrometer, when X is a ratio of the number of silicon atoms attributable to a silicone segment represented by $(Si(R^x)_2O)_n$—$Si(R^x)_2$— in the structure represented by formula (1) in the polyester resin A relative to a total number of measured atoms (silicon atoms/total atoms×100), X1 is a value of X on a surface of the toner particle, and X2 is a value of X at a depth of 30 nm from the surface of the toner particle, and in analysis of the toner particle with an X-ray photoelectron spectrometer, when Z is a ratio of the number of carbon atoms attributable to ester bonds of the polyester resin relative to a total number of measured atoms (carbon atoms/total atoms×100), Z1 is a value of Z on the surface of the toner particle, and Z2 is a value of Z at a depth of 30 nm from the surface of the toner particle.

2. The toner according to claim 1, wherein the content of polyester resin in the binder resin is at least 70 mass %.

3. The toner according to claim 1, wherein the polyester resin is the binder resin.

4. The toner according to claim 1, wherein $(Y1-Y3)/Y1 \geq 0.50$ when X3 is the value of X at a depth of 20 nm from the toner particle surface, Z3 is the value of Z at a depth of 20 nm from the toner particle surface, and Y3 is represented by X3/Z3.

5. The toner according to claim 1, wherein $(Y1-Y4)/Y1 \geq 0.50$ when X4 is a value of X at a depth of 10 nm from the toner particle surface, Z4 is a value of Z at a depth of 10 nm from the toner particle surface, and Y4 is represented by X4/Z4.

6. The toner according to claim 1, wherein the toner particle contains a crystalline polyester resin.

7. The toner according to claim 6, wherein a content of the crystalline polyester resin is 0.5 to 10.0 mass parts per 100 mass parts of the binder resin.

8. The toner according to claim 1, wherein X1 is 7.0 to 12.0 atom %.

9. The toner according to claim 1, wherein the polyester resin A having the structure represented by the formula (1) has the silicone segment and a polyester segment, and the polyester segment is an amorphous polyester resin segment.

* * * * *